United States Patent [19]
Harwell et al.

[11] 4,010,637
[45] Mar. 8, 1977

[54] MACHINE VIBRATION MONITOR AND METHOD

[75] Inventors: Malcolm J. Harwell, Crawfordville, Fla.; Joe A. McInturff, Marietta; Herbert J. Rubel, Atlanta, both of Ga.

[73] Assignee: Lockheed Aircraft Corporation, Burbank, Calif.

[22] Filed: Oct. 6, 1975

[21] Appl. No.: 620,016

[52] U.S. Cl. ............................................ 73/71.4
[51] Int. Cl.$^2$ .................................... G01P 15/00
[58] Field of Search ............... 73/71.4, 71.2, 67.2

[56] References Cited
UNITED STATES PATENTS 3,252,001  5/1966  Thompson et al. ............ 73/71.4 X

OTHER PUBLICATIONS

"A New Method of Vibration Measurement for the Frequency Range 20 to 20,000 cps.," by Massa, pp. 1012–1014, vol. 21, Instruments, Nov., 1948.

*Primary Examiner*—James J. Gill
*Attorney, Agent, or Firm*—Billy G. Corber; John J. Sullivan

[57] ABSTRACT

An accelerometer senses a machine's vibration resulting from unbalance of its internal rotors and outputs an electrical signal which is then conditioned by means of an amplifier and uniform level filter. The resulting output signal has individual vibration (frequency) components which are adjusted to match the machine's specified vibration limit extending over each of the rotors' frequency range to achieve a uniform level. A storage oscilloscope is employed to display the conditioned signal.

By utilizing the uniform level filter a normal operating band for the machine can be specified in terms of oscilloscope divisions regardless of the machine's operating frequencies. When a signal exceeds the specified band on the oscilloscope the rotor causing the excessive vibration may then be determined by analyzing the individual components. Utilizing relatively uncomplicated electronics, a limit exceedance warning may also be incorporated.

10 Claims, 3 Drawing Figures

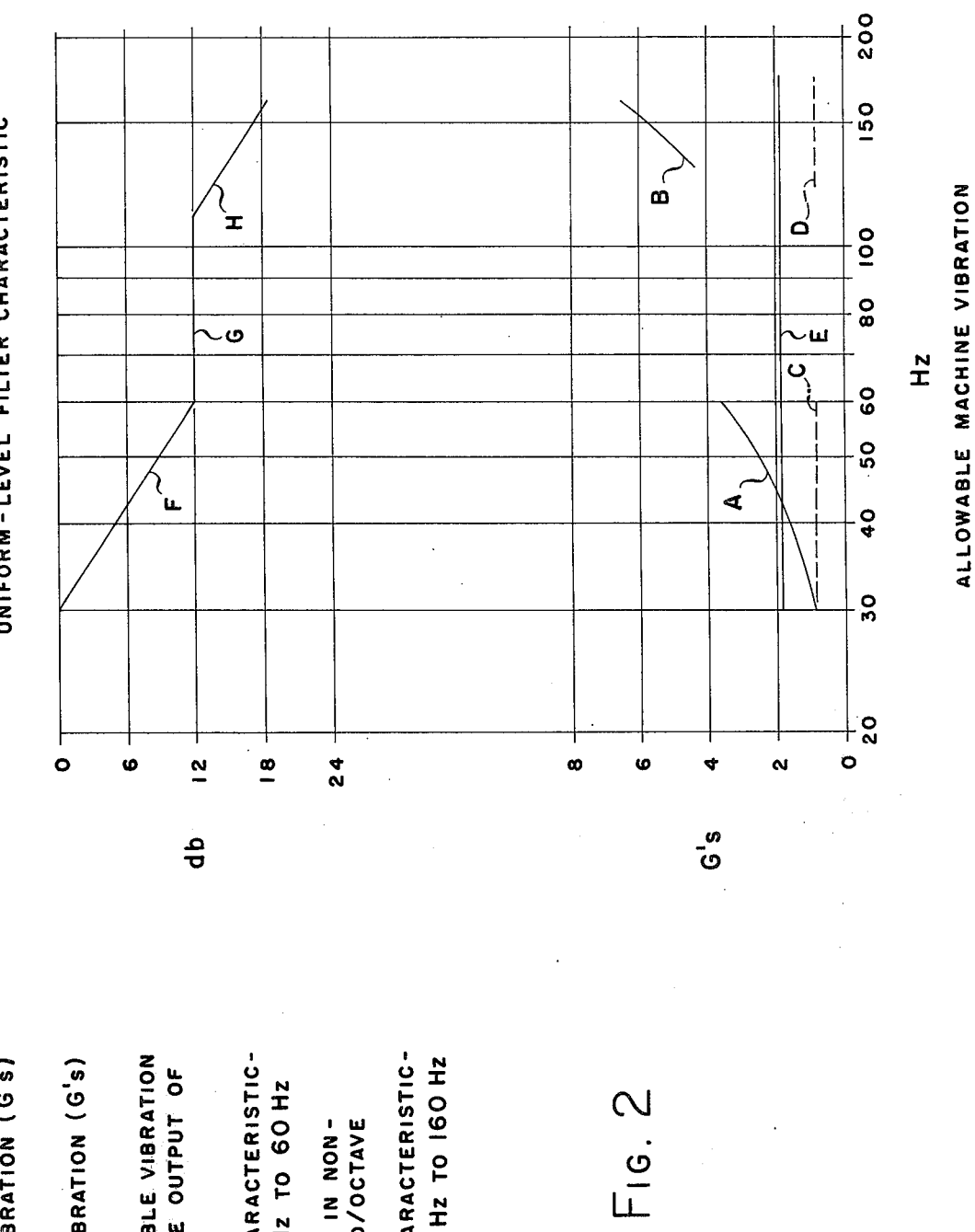

A = ROTOR #1 ALLOWABLE VIBRATION (G's)
B = ROTOR #2 ALLOWABLE VIBRATION (G's)
C = ROTOR #1 ALLOWABLE VIBRATION (G's) AFTER FILTER
D = ROTOR #2 ALLOWABLE VIBRATION (G's) AFTER FILTER
E = UNIFORM-LEVEL ALLOWABLE VIBRATION (G's) FOR THE COMPOSITE OUTPUT OF ROTORS #1 AND #2
F = FILTER ATTENUATION CHARACTERISTIC- 12 db/OCTAVE FROM 30 Hz TO 60 Hz
G = FILTER CHARACTERISTIC IN NON-OPERATIONAL ZONE 0 db/OCTAVE
H = FILTER ATTENUATION CHARACTERISTIC- 12 db/OCTAVE FROM 105 Hz TO 160 Hz

FIG. 2

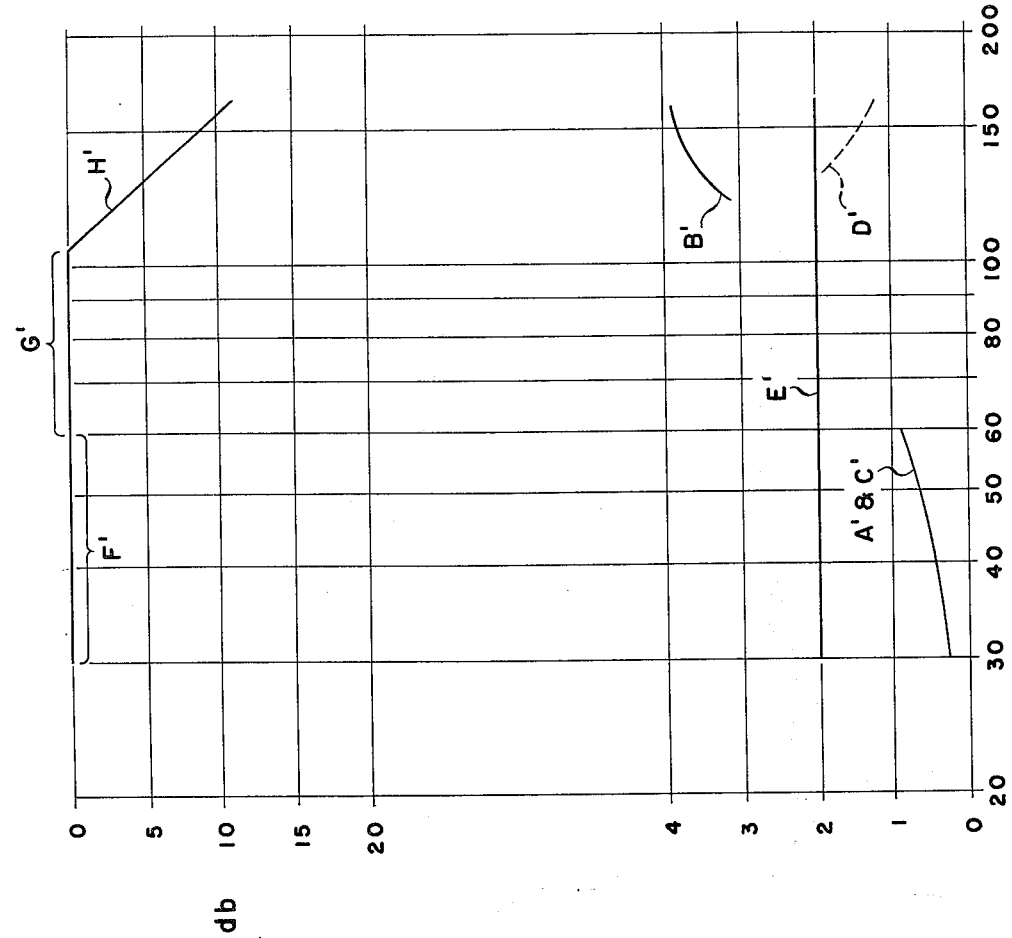

A' = ROTOR #1 ALLOWABLE VIBRATION (G's)
B' = ROTOR #2 ALLOWABLE VIBRATION (G's)
C' = ROTOR #1 ALLOWABLE VIBRATION (G's) AFTER FILTER
D' = ROTOR #2 ALLOWABLE VIBRATION (G's) AFTER FILTER
E' = UNIFORM-LEVEL ALLOWABLE VIBRATION (G's) FOR THE COMPOSITE OUTPUT OF ROTORS #1 AND #2
F' = FILTER ATTENUATION CHARACTERISTIC - 0 db/OCTAVE FROM 30 Hz TO 60 Hz
G' = FILTER CHARACTERISTIC IN NON-OPERATIONAL ZONE
H' = FILTER ATTENUATION CHARACTERISTIC - 18 db/OCTAVE FROM 105 Hz TO 160 Hz

FIG. 3

MACHINE VIBRATION MONITOR AND METHOD

The invention described herein was made in the course of or under contract with the U.S. Air Force.

This invention relates to generally to vibration monitoring of rotating bodies or spools and more particularly to a method of and means for monitoring a machine's vibration caused by unbalance in its internal rotors. Stated differently, this invention is directed to a method of, and a vibration monitor for, measuring the magnitude of vibration of rotating bodies or spools wherein a filter design is employed which allows a uniform vibration display limit to be applied to a machine, such as for example an aircraft jet engine, vibrating at several frequencies in order to detect rotor imbalance and/or wear preliminary to failure.

While the present invention has general utility and application to machines of all kinds its structure and function may be better understood and its value more readily appreciated when related to aircraft. In present day aircraft turbo jet engines are employed which have massive moving parts in the form of fans or turbines which can during failure penetrate the cabin and cause serious damage to the aircraft and occupants alike. It is, therefore, desirable to monitor the operation of these engine turbine rotors to the end that repair and/or replacement can be effected prior to the failure thereof and any resulting damage to property and persons.

Attempts heretofore made to detect incipient engine failure through the analysis of vibrational outputs have been directed toward the separation of the various frequencies which comprise the vibration and the individual determination of amplitude at these frequencies. Prior art techniques for assessing such vibration generally utilize accelerometer pickups, filter the composite signal to obtain the required frequency components, then integrate the signals and display the voltage on meters. In this type system false indications can occur due to the filter's inability to completely block out unwanted vibration components or due to certain monitoring system malfunctions. Other techniques utilize complex equipment such as spectrum analyzers to determine the magnitude of each component. The latter approach does not lend itself to an on-board, flyable aircraft system.

It is therefore, the primary purpose of the present invention to provide a relatively uncomplicated and reliable apparatus to monitor an engine's vibration caused by unbalance in its internal rotors. In some respects the apparatus herein proposed is similar to apparatuses known to the art. For example U.S. Pat. No. 3,758,758 issued to John E. Games et al. on Sept. 11, 1973 employs a frequency weighting concept for analyzing the health of rotating machinery. In so doing each of a plurality of sensed frequency bands are weighted according to their respective relevance to machine health, with the individual weighting being summed to provide an overall indication as to the condition of the machine.

The apparatus herein proposed is unlike the prior art, as typified by the above patent in that it detects and weights the various fundamental engine rotor frequencies and in addition relates these frequencies to $g$'s and produces an output for a properly functioning engine which is below the uniform allowable limit. The patented apparatus cannot read out a uniform level limit $g$, which is essential to the present apparatus. At the same time the present apparatus does not weight side bands, essential to the prior art apparatus.

U.S. Pat. No. 3,705,516 issued on Dec. 12, 1972 to James J. Reis relates to a machine vibration analyzer wherein the ratio amplitude of two separated vibration frequency bands is compared to a standard ratio for indicating the condition of the machine. Unlike the apparatus proposed herein this patented analyzer cannot take the signals from two bands of interest and read out a uniform level limit $g$. Also this patented device must have a medium amplitude range, making it extremely limited in use.

U.S. Pat. No. 2,679,629 issued on May 25, 1954 to Martin W. Hellar, Jr. employs a combination voltage limiting device and parallel arranged band pass filter element for converting a variable amplitude, variable frequency mechanical vibration to a constant amplitude sine wave which is proportional to the rotational speed of the machine producing the mechanical vibration. This device will not measure rotor unbalance. Also like most filters the filters of this patented device are arranged for a flat response. The filter of the presently proposed apparatus on the other hand is arranged so that the high frequency band pass is added to the low frequency band pass in such a manner as to combine the several rotor limit unbalances into a single limit for the entire engine.

More particularly, the present invention applies a uniform limit to the machine or engine which is vibrating at several frequencies. This applied uniform limit does not change as one or more of these frequencies change. On malfunctioning of an engine rotor, however, the uniform amplitude output deviates noticeably and this is indicated to an operator or viewer in an appropriate form, i.e., visually, audibly, etc., as desired.

As stated hereinbefore, prior vibration monitoring systems have unwanted characteristics which greatly impair their usefulness. Malfunctions within the monitoring system often lead to false indications of machine vibrations thereby causing the operator to distrust all indications. Since the more common system has a meter as an output device, the operator cannot tell whether a deflection of the movement is caused by actual machine vibration or various malfunctions such as a shorted or vibrating cable. Presently, the usefulness of known airborne vibration monitor (AVM) systems is very questionable.

In developing the system herein described aircraft testing revealed many of the problems that plague existing AVM systems. For example, the filter characteristics do not sufficiently separate the individual engine rotor vibration components from each other, or from other vibrating parts or mechanisms such as hydraulic pumps. In fact, some AVM systems' vibration indications are more indicative of a vibrating hydraulic pump than they are of an out-of-balance engine rotor. Since the vibration signal from the accelerometer is proportional to the square of the displacement frequency, it can readily be seen that only a small amount of hydraulic pump vibration coupled onto the engine results in an output signal which is predominantly hydraulic pump because it may operate at a speed an order of magnitude higher than the engine rotor. Also, it can be seen that the higher frequency rotor vibration tends to mask the low frequency rotor vibration; therefore, a meter reading of the lower frequency vibration such as the engine fan indication utilizing prior art systems could be predominantly the higher frequency vibration such as the engine core indication.

This invention recognizes the inefficiency of a practical, airborne electronic filter in separating the various frequency components completely and, in fact, makes use of this inefficiency for the uniforms level concept. The uniform level concept is based on a filter design that conditions the vibration signal which is received from an accelerometer transducer, mechanically coupled to the machine, in such a manner so as to produce a composite uniform level signal regardless of the machine's operating speed. The signal is also conditioned so as to give cognizance to the slower speed rotors' vibration signal thereby resulting in an output signal where each of the fundamental rotor vibration components can be absolutely recognized and its magnitude determined utilizing a display storage device such as a recorder or oscilloscope.

More specifically, the filter in the present vibration monitor is adjusted in advance to receive the several engine rotor frequencies which are then modulated or combined into an output relative to any of several g-forces of interest. The g-forces of interest may be a combination of inputs from static structure and inputs from one or more engine rotors. Thus, a single limit output is established and preset which if exceeded can be employed to alert the operator by energizing a warning device. Additional means is provided which permits the operator, if desired, to analyze the excessive output signal to verify the warning and also determine which engine rotor is over the limit.

With the above and other objects in view as will be more apparent this invention consists in the construction, combination and arrangement of parts all as hereinafter more fully described, claimed and illustrated in the accompanying drawing, wherein:

FIG. 2 is an illustrative plot of one form of a uniform level filter characteristic for the indicated machine vibration allowable levels; and FIG. 3 is another illustrative plot of a form of uniform level filter characteristic for the indicated machine vibration allowable levels.

Figure 1:
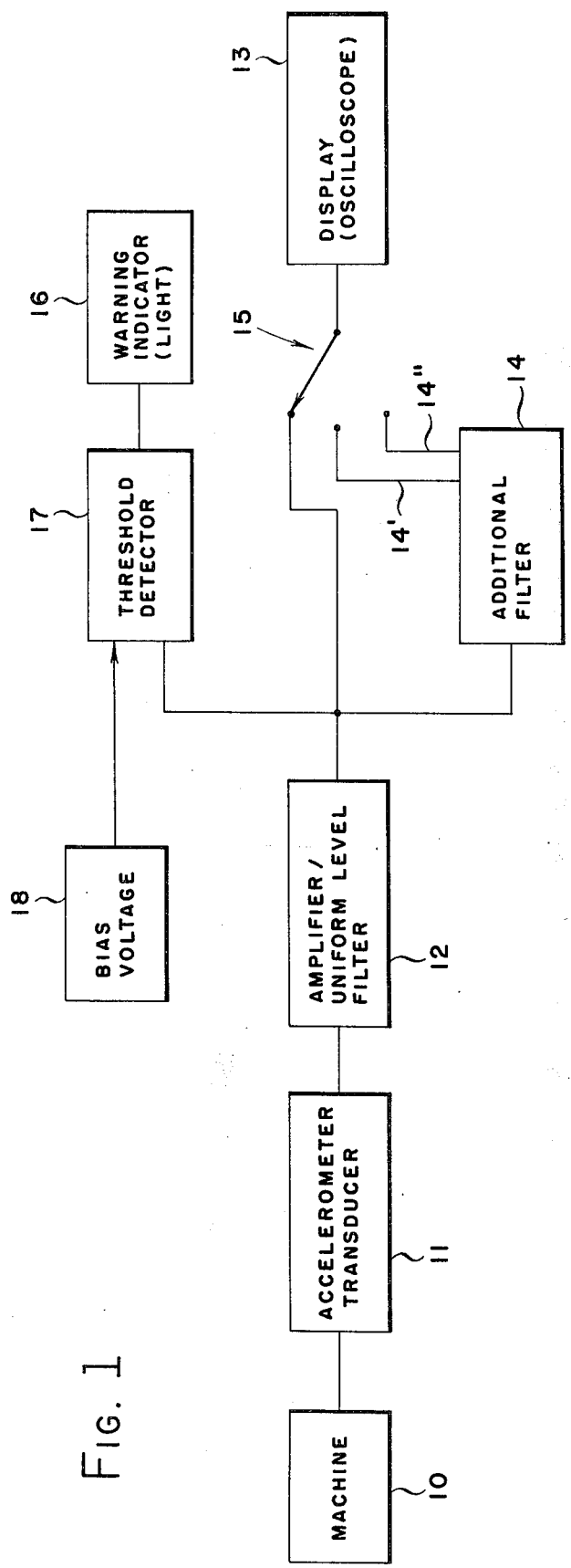
FIG. 1 is a block diagram of a vibration monitor in accordance with the teachings hereof to show generally the interconnection of the several components thereof.

Referring more particularly to the drawings FIG. 1 shows a machine 10 which is under observation with an accelerometer transducer 11, mechanically connected to it. The transducer 11 is sensitive to the vibration components of the machine 10 and outputs a composite electrical signal which is proportional to the second derivative of the displacement of these components. An amplifier and uniform level filter 12 is operatively connected to the transducer 11 and serves to receive the composite electrical signal from the transducer 11 and raise it to a more useable level. The amplification factor produced by the filter 12 is selected so as to give cognizance to the smaller vibration signal components which result from the slower rotating rotors of the machine 10. Such cognizance is effected by increasing the frequency component of the slower rotors in proportion to the faster rotors. The amplified signal is then processed by the uniform level filter 12.

Normally the filter 12 attenuates the various vibration components to produce a uniform level output, however in some cases attenuation of one or more of the components is unnecessary. The characteristics of the filter 12 are such that each rotor's vibration component is adjusted so it will not be masked by other components, when a rotor exceeds a specified out-of-balance. Its vibration component will cause the composite vibration waveform to exceed the normal operating uniform level limit which has been established for the machine 10 at normal operating speed. The composite vibration waveform is uniform level regardless of the machine's speed.

The composite, uniform level vibration signal is then input to a display device, such as for example a commercially available storage oscilloscope 13. The operator can readily verify that the system is functioning properly by checking the time base of any one of the vibration components to assure that it corresponds to the associated rotor's indicated speed. Once the integrity of the system is assured the operator then notes whether or not the amplitude of the composite waveform has exceeded the prescribed uniform level limit. No further action is necessary if the amplitude is within limits.

When the composite waveform exceeds the uniform level limit the faulty rotor's vibration magnitude (as measured at the accelerometer location) is determined. By utilizing the appropriate time base of the oscilloscope 13 the magnitude of each of the components can be determined. For example, in a two rotor system, the storage oscilloscope 13 is preset to display one or two cycles of the higher vibration component and its peak-to-peak magnitude is determined. Some skew across the oscilloscope 13 may be caused by the lower frequency component but it does not prevent the operator from determining the high frequency components amplitude.

The overall peak-to-peak amplitude of the composite waveform (using a magnitude slower sweep speed) is then determined. The low frequency component is then found by subtracting the high frequency component amplitude from the composite amplitude. If desired, each component amplitude can be determined directly by means of and through an additional filter 14 connected to the filter 12 at the output side thereof to receive the uniform level composite signal, separate each of the components thereof and then input each of these components as additional inputs to the display 13. To accomplish this a selector switch 14 may be employed in the circuit between the filter 12 and the display 13 to operatively connect and disconnect the additional filter 14. By taking into account the amplification or attenuation factor of the filter 12 each of these magnitudes is converted to g's for the respective rotor regardless of the method used to obtain each component which is individually transmitted to the oscilloscope 13 through connectors 14' and 14".

A warning indicator 16 in the form of a light for example or the equivalent is included in the system to alert the operator when the vibration data exceeds the uniform level limit. The warning indicator 16 is energized by a threshold detector 17 preset by a bias voltage 18 and will turn on the light 16 when the preset voltage is exceeded.

Referring now specifically to FIG. 2, an example of a uniform level filter characteristic is illustrated for a machine having for example two rotors. The curves A and B respectively on the lower chart show the allowable vibration levels for each of two rotors as established by the machine manufacturer. The three segment curve F, G and H on the upper chart is an example of an acceptable uniform level filter for this particular machine. Curve A indicates the limit of normal machine operation for rotor No. 1 which operates, for example, at 1800 to 3600 RPM's (30 to 60 Hz). This curve A represents a 0.020 inch axial displacement converted to 9's extending over rotor No. 1's operating band. Curve B is rotor No. 2's normal operating limit in g's for a 0.005 inch axial displacement over the frequency range of 7200 to 9600 RPM's (120 to 160 Hz).

Segment F of the filter characteristic curve represents a 12 Db per octave attenuation in rotor No. 1 operating range. This attenuation, when applied to rotor No. 1's vibration output, will result in a constant output from the filter 12 for a given out-of-balance over rotor No. 1's operating band. Curve C indicates the limit of normal operation for rotor No. 1 after the vibration signal has been conditioned by the filter 12.

Similarly, rotor No. 2, represented by curve B, will result in the uniform level output D when filtered by segment H of the uniform level filter 12. Curve E represents the composite uniform level operational limit for the machine 10 which is the sum of curve C and curve D.

The following Table I indicates the values used in constructing the filter represented by FIG. 2 (note that a uniform level output of 1.84 is achieved):

TABLE I

| Engine Speed (Hz) Rotor No. 1/No. 2 | Rotor No. 1 Filter (A&C) In | Out | Rotor No. 2 Filter (B&D) In | Out* | Uniform Level Filter Output (E) |
|---|---|---|---|---|---|
| 30/130 | 0.92 | 0.92 | 4.32 | 0.92 | 1.84 |
| 40/140 | 1.64 | 0.92 | 5.01 | 0.92 | 1.84 |
| 50/150 | 2.56 | 0.92 | 5.75 | 0.92 | 1.84 |
| 60/160 | 3.68 | 0.92 | 6.54 | 0.92 | 1.84 |

*Filter output based on 12 Db/octave over operating range of rotors No. 1 and No. 2.

The details involved in arriving at the filter characteristics for a uniform level filter output as shown in Table I above is described as follows. The rotor manufacturer has specified a 0.020 inch axial displacement or constant amplitude for rotor No. 1 over its operating range of 30–60 Hz. An axial displacement or constant amplitude of 0.005 inches is specified for rotor No. 2 over its operating range of 130 to 160 Hz. From these characteristics rotor No. 2 is operating at a frequency 100 Hz. higher than that of rotor No. 1.

For the specified allowable displacement, the allowable acceleration is calculated for each of the rotors No. 1 and No. 2 as shown in columns 2 and 4 respectively for the respective rotor speeds of column 1. Since the displacement for each of the rotors No. 1 and No. 2 was specified by the manufacturer as being constant over its operating range, then the frequency dependency of each of the rotor's components (i.e., output in g's) can be eliminated by attenuating that component signal at a rate of 12 db per octave in its operating range. The rate of 12 db per octave attenuates the signal at a rate equivalent to the logarithmic change in signal caused by the frequency dependency which is all that is required for a constant level of amplitude.

The resultant filtered signal for rotor No. 1 at all speeds throughout its operating range is shown as 0.92 in column 3 and for rotor No. 2 at all speeds throughout its operating range as 0.92 in column 5. When the values of column 3 are added to those of column 5 the uniform level filter output of 1.84 as shown in column 6 results.

FIG. 3 is an example of another uniform level filter design. Curve A' indicates the allowable level of normal machine operation for rotor No. 1 and C' the limit of normal operation for rotor No. 1 after it has been attenuated by the segment F' of the filter 12. Curve B' indicates rotor No. 2's allowable level and curve D' represents rotor No. 2's allowable level after it has been attenuated by the uniform level filter 12 illustrated by the segment H'. This uniform level design is utilized where there is a definite speed relationship between the two rotors.

The FIG. 3 design also gives cognizance to the slower rotor by not attenuating it since its signal component is much less than rotor No. 2. The result will be a composite signal output whose individual rotor vibration components have relative magnitudes in the engine's normal operating range.

The following Table II indicates the values used in constructing the filter represented by FIG. 3 (note that a uniform level output of approximately 2 is achieved):

TABLE II

| Engine Speed (Hz) Rotor No. 1/No. 2 | Rotor No. 1 Filter (A'& C') In and Out | Rotor No. 2 Filter (B'&D') In | Out* | Uniform Level Filter Output (E') |
|---|---|---|---|---|
| 30/130 | .23 | 3.5 | 1.9 | 2.1 |
| 40/140 | .41 | 3.7 | 1.6 | 2.0 |
| 50/150 | .64 | 3.8 | 1.4 | 2.0 |
| 60/160 | .92 | 3.9 | 1.2 | 2.1 |

*Filter output based on 18 Db/octave over rotor No. 2's operating range.

The method herein contemplated may be summarized as detecting the unbalance in the rotors of a machine during its operation by generating an electrical output signal related to the vibration acceleration developed in the machine. The signal thus generated is then converted into a new signal having fundamental frequency proportional to each of the machine's vibration acceleration components. This new signal is then conditioned to cause each frequency component to have substantialy the same magnitude and the total of all the frequency components to remain uniform over the entire speed range of the machine. The resulting signal is then compared with a predetermined reference to thereby indicate the amount of unbalance of the rotors and the degree of wear thereon.

The details involved in arriving at the filter characteristics for a uniform level filter output as shown in Table II above is described as follows. The rotor manufacturer's limits are so specified as to also establish the machine characteristics whereby rotor No. 2 is operating at a frequency 100 Hz. higher than rotor No. 1. This establishes the associated frequency for rotor No. 2 for the corresponding rotor No. 1 frequencies as shown in column 1 of Table II, i.e., 30/130 etc.

The rotor No. 2 displacement or amplitude allowables as specified by the rotor manufacturer, however, in this machine, unlike those in the machine of Table I, is not constant but varies with frequency. With such specified displacement the allowable accelerations can be calculated and are shown in columns 2 and 3 respectively of Table II. Since, as above stated, cognizance is to be given to the smaller vibration signal components, no attenuation is applied to the slower rotor No. 1. The higher frequency rotor No. 2 is attenuated at a rate so as to produce a signal that when added to the slower frequency rotor No. 1 will result in a constant level. In the case of the machine of Table II it is apparent that 18 db per octave attenuation was required. Thus, when the values of column 2 are added to those of column 4 the uniform level filter output column 5 (E') results.

From the foregoing it is, therefore, obvious that a uniform level filter can be designed and constructed to produce a single level limit for a machine over its speed range. Having thus defined the filter characteristic one need only to select components as taught for example by Hassell (*FILTER DESIGN AND EVALUATION*, Grant E. Hassell, Van Nostrand Reinhold Company, 1969) and Kincaid (*RC FILTER DESIGN BY THE NUMBERS*, Russell Kincaid, The Electronic Engineer, Oct. 1968).

In all cases the frequencies of interest, i.e., rotor unbalance frequencies, will be low, falling in the range of approximately 0 to 1000 Hz. Therefore, from a size, weight and cost viewpoint an active filter is preferred. Butterworth characteristics as taught by the references are preferred due to bandpass characteristics although the Tchebycheff filter may be required to meet the specified attenuation of the uniform-level filter. Since the filter's characteristic is dependent on the associated machine's characteristics as specified by the manufacturer, it naturally follows that each filter is peculiar to that particular machine.

The present method further envisions an additional step to generate a warning indication when the conditioned signal exceeds the predetermined reference. Similarly, it is expected, where desirable, to separate each of the components which comprise the conditioned signal and comparing them individually against the predetermined reference.

What is claimed is:

1. A monitor to measure the vibrating frequency of a machine caused by the unbalance of its internal rotors vibrating at several frequencies to determine in advance an approach of excessive vibration and an incipient failure of the machine comprising:
    an accelerometer transducer connected to said machine to receive the total vibration thereof at all operating speeds and produce a single output signal;
    an amplifier and uniform level filter connected to said transducer to receive said output signal and raise it to a predetermined substantially constant level over the entire speed range of said machine, said filter having components selected to simultaneously compensate for both the frequency dependence of said signal and the variable displacement allowables of said rotors; and
    an oscilloscope adapted to be connected to said filter to receive and display said constant level signal whereby it may be compared with a pre-established reference level of safe operation of said machine.

2. The monitor of claim 1 wherein said single output signal from said accelerator transducer is proportional to the second derivative of the displacement of each fundamental rotor vibration component of said machine.

3. The monitor of claim 1 including a warning indicator adapted to be connected to said filter and preset for actuation by said output signal when the level thereof exceeds said pre-established level.

4. The monitor of claim 1 including an additional filter, a first connection between said additional filter and said uniform filter, a second normally inoperative connection between said additional filter and said oscilloscope, and a switch operative to disconnect said oscilloscope from said uniform filter and simultaneously render said second connection operative, said additional filter being adapted to separate from said constant level signal the signal corresponding to the vibration of each of said rotors.

5. The monitor of claim 3 wherein said warning device is a light energized by a threshold detector preset by a bias voltage.

6. The monitor of claim 3 further including an additional filter adapted to be connected to said uniform level filter and separate from said constant level signal the signal corresponding to the vibration of each of said rotors, and a selector switch operable to connect in the alternative any one of said oscilloscope, said warning indicator and said additional filter to said uniform level filter.

7. The method of detecting imbalance in the rotor system of a machine while operating, consisting essentially of:
    generating an electrical output signal related to the vibration acceleration developed in the machine;
    converting said electrical output to an electrical signal whose fundamental frequency components are proportional to each of the machine's vibration acceleration components;
    first conditioning said electrical signal to cause each frequency component to have approximately the same magnitude;
    then conditioning said electrical signal to cause the sum of said frequency components to remain substantialy constant over the speed range of the machine; and
    comparing said electrical signal thus conditioned to a predetermined reference level.

8. The method of claim 7 including the additional step of registering the results of the comparison aforesaid.

9. The method of claim 7 including the additional step of generating a warning indication when said conditioned signal exceeds said predetermined reference level.

10. The method of claim 7 including the additional step of separating each of the components comprising said conditioned signal prior to comparing said conditional signal to said predetermined reference level.

* * * * *